United States Patent [19]
Seekins et al.

[11] Patent Number: 5,090,714
[45] Date of Patent: Feb. 25, 1992

[54] CROSS-COUNTRY SLED KIT AND ASSEMBLY

[76] Inventors: Barbara H. Seekins; Tom W. Seekins, both of 401 Ben Hogan Dr., Missoula, Mont. 59803

[21] Appl. No.: 653,706

[22] Filed: Feb. 11, 1991

[51] Int. Cl.$^5$ .............................................. A63C 17/06
[52] U.S. Cl. ...................................... 280/24; 280/1.5; 280/19; 280/845
[58] Field of Search ................ 280/24, 845, 19, 250.1, 280/1.5; 297/352

[56] References Cited

U.S. PATENT DOCUMENTS

| | | | |
|---|---|---|---|
| 26,164 | 11/1859 | Crandall | 280/24 |
| 2,365,174 | 12/1944 | Cochran | 280/18 |
| 2,394,264 | 2/1946 | Robinson | 280/845 |
| 2,613,953 | 10/1952 | Giovannoni | 280/58 |
| 3,104,116 | 9/1963 | Knight, Jr. | 280/18 |
| 3,202,437 | 8/1965 | Masbruch | 280/18 |
| 3,222,080 | 12/1965 | Kinraide | 280/18 |
| 3,355,186 | 11/1967 | Bradley | 280/19 |
| 3,779,572 | 12/1973 | Cheney | 280/24 |
| 3,912,290 | 10/1975 | Rich | 280/9 |
| 4,132,427 | 1/1979 | McGee | 280/19 |
| 4,335,891 | 6/1982 | Alley et al. | 280/19 |
| 4,389,066 | 6/1983 | Weir et al. | 280/24 |
| 4,567,853 | 2/1986 | Hayden | 119/102 |
| 4,805,925 | 2/1989 | Haury et al. | 280/250.1 |
| 4,848,780 | 7/1989 | Straub | 280/47.25 |

OTHER PUBLICATIONS

Mountain Smith Sled Catalog, 4 pages, undated.
Tur-Pulk Faering Design Catalog, 4 pages, undated.
Wilderness Trail Sled Product Information Sheet, 1 Page.

Primary Examiner—Andres Kashnikow
Assistant Examiner—Eric Culbreth
Attorney, Agent, or Firm—John R. Flanagan

[57] ABSTRACT

A recreational cross-country sled assembly includes a standard sled and a kit adapting the sled for transporting children and equipment over snow-covered terrain while nordic skiing. The kit includes a towing harness system for interconnecting the sled and skier torso, and a seat and frame structure for mounting on the sled. The towing harness system includes an elongated towing structure in the form of a pair of towing poles, being pivotally coupled to the sled, and a belt to be worn by a skier and to which the towing poles are attached for pulling the sled. The kit also includes sets of carrying straps with releasable connecting elements for attachment on the sides of the sled to be used to hold equipment. The seat and frame structure includes a U-shaped frame member supported in an inverted, inclined relationship to a top portion of the sled by an upright frame member, and a seat cover and cushion mounted by inclined U-shaped frame member in overlying relation to the top portion of the sled.

16 Claims, 2 Drawing Sheets

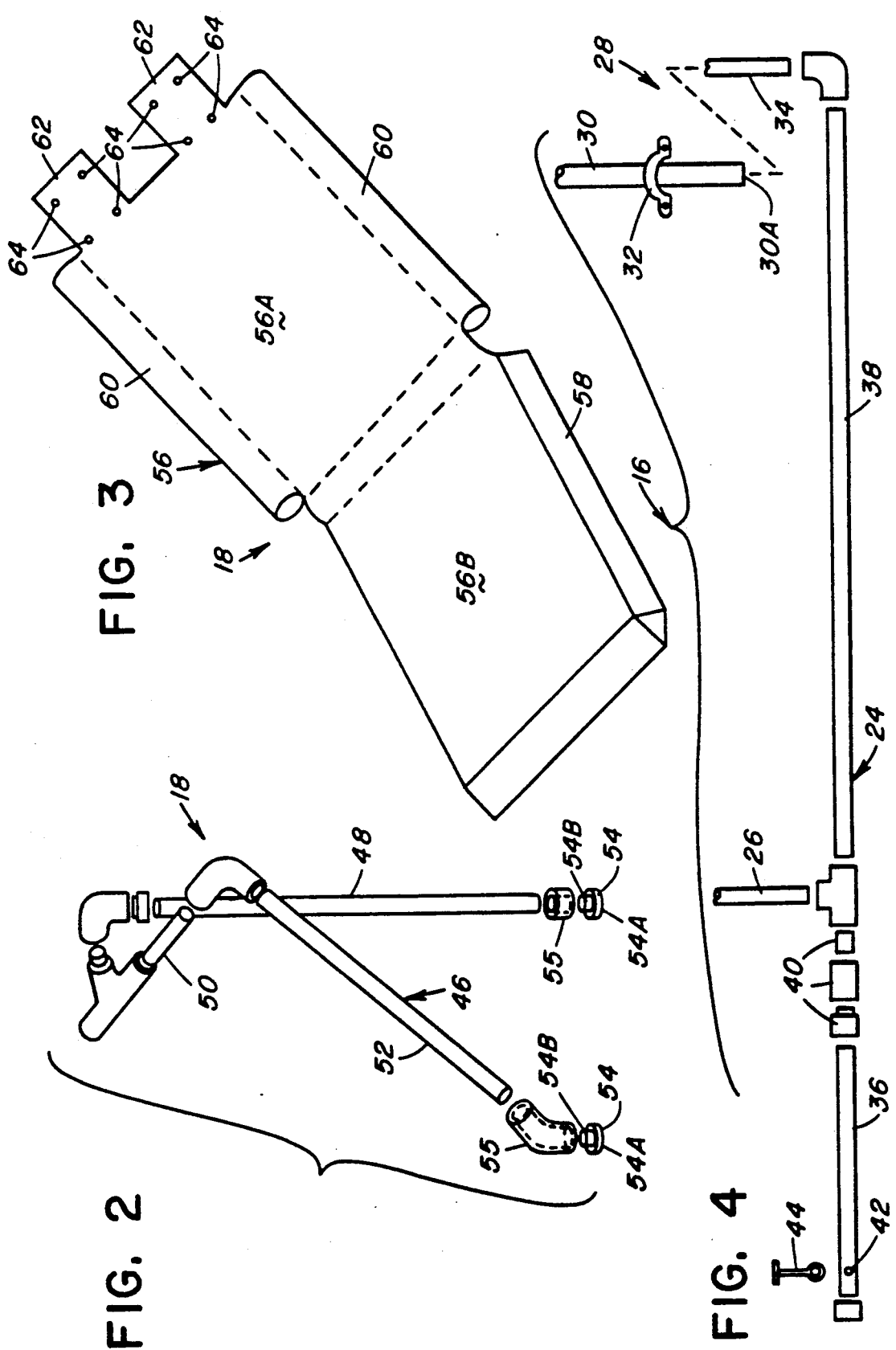

CROSS-COUNTRY SLED KIT AND ASSEMBLY

BACKGROUND OF THE INVENTION

1. Field of the Invention

The present invention generally relates to a recreational sled or toboggan and, more particularly, to a cross-country sled kit and assembly which adapts a standard sled for pulling children and/or equipment over snow-covered terrain in a safe and efficient manner while nordic skiing.

2. Description of the Prior Art

In recent years, there has been a substantial increase in winter sports activities, particularly cross-country skiing and tobogganing. There has also been an increase in families striving to participate in these sports together. The increased popularity of winter sports with children has created a need for equipment for hauling children and equipment. The availability of appropriate equipment would allow more individuals to participate in these sports with their children.

One method of carrying children and equipment has been by use of a backpack. However, this method puts a great amount of weight on the skier and is dangerous should the skier fall. Such use of backpacks is also limited to skilled skiers.

Heretofore, sleds or toboggans have not provided a seat for passengers. This causes an uncomfortable ride thereby shortening the duration of the outing for the family.

While the system of a sled with poles has been used for rescue purposes and transporting an animal carcass, it does not have features that would facilitate the hauling of children and equipment. Also, such sled and pole systems, as illustrated in U.S. Pat. No. 2,365,174 to Cochran, typically requires two skiers for proper operation. This limits the freedom of family members during the outing and may limit use due to lack of proficient operators. U.S. Pat. Nos. 3,222,080 to Kinraide and 3,104,116 to Knight, Jr. require the poles be held by the skier, thus not leaving his or her hands free for ski poles or general balance. U.S. Pat. No. 3,202,437 to Masbruch requires a control cable strapped over the skier's shoulder, a further encumbrance.

Additionally, the materials used in previous sleds or toboggans have been expensive and prevented purchase by a majority of those who could benefit from such a device.

Consequently, a need exists for improvements in toboggans or recreational sleds for use in transporting children and equipment while nordic skiing which will result in greater comfort and safety of both operator and passenger as well as convenience and economy.

SUMMARY OF THE INVENTION

The present invention provides a cross-country sled kit and assembly for satisfying the aforementioned needs. For the sake of brevity, when used hereinafter the word "sled" is also intended to include a "toboggan" and like device.

The principal object of the present invention is to provide a safe, efficient, and comfortable device for transporting children and/or equipment over snow-covered terrain while nordic skiing. The device of the present invention is an assembly which includes the combination of a sled, being standard or conventional per se, and a kit to adapt the sled for carrying a passenger and/or equipment while being pulled by a cross-country skier. Basically, the kit includes a towing harness system for interconnecting the sled and skier torso, and a seat and frame structure for mounting on the sled. The towing harness system includes an elongated towing structure, in the form of at least one and preferably a pair of towing poles, capable of being pivotally coupled to the sled, and a hip belt to be worn by the skier and to which the towing structure is attached for pulling the sled. Also, the kit includes sets of carrying straps with releasable connecting elements, such as hook and loop tape or patches, for attachment on the sides of the sled to be used to hold equipment, such as a child's skis.

Another object of the present invention is to provide for easy breakdown, transport and storage of the cross-country sled kit and assembly. The seat and frame are easily removable and collapsible, and the towing poles can be disassembled for easy storage. The sets of straps can be used for securing the poles to the sled for transport and storage.

Another object of the present invention is inexpensive manufacture. The seat frame and towing poles of the kit are made of widely available low-cost materials, such as hollow plastic (PVC type) pipe and fittings or other suitable materials. The sled can be a standard four-foot plastic recreational type.

The above and other objects, advantages and features of the present invention will become more readily apparent from the consideration of the accompanying drawings.

BRIEF DESCRIPTION OF THE DRAWINGS

FIG. 2 is an enlarged exploded perspective view of a portion of frame of a set and frame structure of the kit of FIG. 1 with parts of the frame being illustrated in foreshortened form.

FIG. 3 is an enlarged perspective view of a seat cover and cushion of the seat and frame structure of the kit of FIG. 1.

FIG. 4 is an enlarged exploded top plan view of half of the towing structure of the kit of FIG. 1.

DETAILED DESCRIPTION OF THE PREFERRED EMBODIMENT

Figure 1:
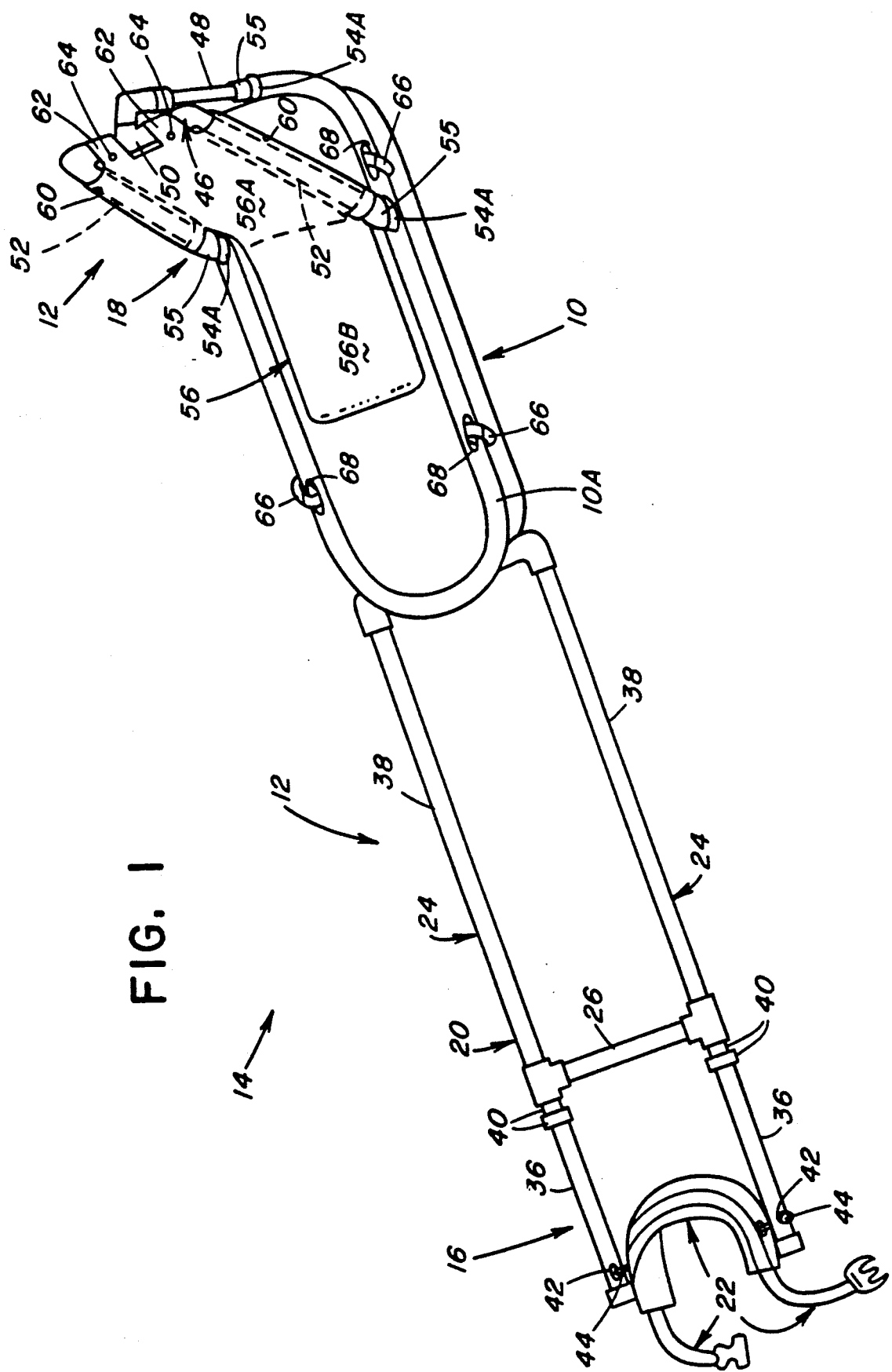
FIG. 1 is a perspective view of the cross-country sled assembly of the present invention comprised of a standard sled and an adaptive kit of the present invention.

Referring now to the drawings, and more particularly to FIG. 1, there is shown a sled 10 in combination with a kit 12 of the present invention, for use in adapting the sled 10 into a cross-country sled assembly 14 of the present invention for carrying a passenger and/or equipment while being pulled by a cross-country skier. The sled 10 can be a conventional, or standard, plastic sled per se. Preferably, it is approximately four feet in length, includes a rounded lip 10A extending about its upper peripheral edge, and has a height sufficient to attach the components of the kit 12 to it. In its basic components, the kit 12 includes a towing harness system 16 for interconnecting the front end of the sled 10 to the skier's torso, and a seat and frame structure 18 mounted on the upper side of the sled 10.

Referring to FIGS. 1 and 4, the towing harness system 16 has an overall rectangular configuration. The harness system 16 includes an elongated towing structure 20 pivotally coupled to the sled 10, and a belt 22 to be worn by the skier preferably about the hips and waist region and to which the towing structure 20 is attached for pulling the sled 10. The towing structure 20 includes at least one and preferably a pair of towing poles 24, a cross brace 26 interconnecting the poles 24 closer to the forward ends than to the rear ends thereof, and a hinge 28 for pivotally coupling the rear ends of towing poles 26 to the sled 10.

The hinge 28 of the towing structure 20 is composed of an elongated hollow tubular hinge member 30 attached by a pair of spaced brackets 32 (only one being shown) in transverse relation to the front underside of the sled 10, and a tubular cross member 34 threadably attached to rear ends of towing poles 24. The tubular hinge member 30 provides a stationary hinge attachment on the sled 10 for the remainder of the towing structure 30 which can be detached when desired. The tubular cross member 34 on the towing poles 24 extends through opposite open ends 30A on the tubular hinge member 30 so as to pivot or rotate freely within the tubular member 30. In such manner, the towing poles 24 are pivotally coupled at their rear ends to the sled 10.

As depicted in FIG. 4, each of the two towing poles 24 are constructed of elongated front and rear tubes 36, 38 which are interconnected by using threaded male and female pipe adaptors 40. These components can be fabricated from conventional hollow plastic (PVC type) pipe and fittings, or any other suitable materials. The front ends of the front tubes 36 of the towing poles 24 have holes 42 through which standard clevis pins 44 may be inserted. The belt 22, which can be a standard backpack hip belt, is attached to the towing poles 24 using the clevis pins 44.

Referring to FIGS. 1-3, the seat and frame structure 18 includes a U-shaped frame member 46 and a straight frame member 48. The U-shaped frame member 46 has an upper bight portion 50 and a pair of leg portions 52 connected to and merging downwardly from the bight portion 50. The leg portions 52 are attachable at their lower ends to the sled 10 by plugs 54. The straight frame member 48 is positioned upright on the sled 10, extending between and connected at its top end to the middle of the upper bight portion 50 of the U-shaped frame member 46 and at its bottom end by another plug 54 to the sled 10. The plugs 54 are attached at their bases 54A on an upper perimeter lip 10A of the sled 10 by any suitable means. Tubular couplers 55 receive the bottom ends of the leg portions 52 of the U-shaped frame member 46 and upper necks 54B of the plugs 54 so as to interconnect the upright frame member 48 to the plugs 54. The upright frame member 48 supports the U-shaped frame member 46 in an inverted and inclined relationship to a top portion of the sled 10. As seen in FIG. 1, the U-shaped frame member 46 is inclined toward the rear of the sled 10. The U-shaped and straight frame members 48 can be constructed of hollow plastic (PVC type) pipe and fittings, or any other suitable materials, which preferably have threaded connections which allow them to be assembled an attached to the sled 10 or removed and disassembled into individual components for transport or storage.

The seat and frame structure 18 also includes a seat cover 56 and a cushion 58 inserted in the cover 56. An upper portion 56A of the cover 56 extending between the inclined leg portions 52 of the U-shaped frame member 46 has side loop portions 60 permitting it to be slipped over the leg portions 52 before the member 46 is mounted to the sled 10. The cover 56 also has top flaps 62 with sets of snaps 64, permitting attachment of the flaps 62 to the bight portion 50 of the U-shaped frame member 46. After applying of the seat cover, the lower ends of the U-shaped frame member 46 and upright frame member 48 can then be attached to the sled 10 by the plugs 54. The cushion 58 is mounted to a lower portion 56B of the seat cover 56 by any suitable means, such as by hook and loop tape. The cushion 58 and lower portion 56B of the seat cover 56 overlie a top portion of the sled 10.

Finally, the kit 12 includes sets of carrying straps 66 with releasable connecting elements, such as hook and loop tape or patches. The straps 66 are mounted through slots 68 in the lip 10A of the sled and can be used for attachment of equipment, such as a child's skis along on the sides of the sled 10.

The cross-country sled assembly 14 of the present invention shown in FIG. 1 serves many functions: 1) a child can be transported in comfort behind a nordic skier, the seat providing support for the back and the padded seat protecting the child from the cold; 2) the seat may be removed or layed in the base of the sled so a child can sleep while riding; 3) equipment can be hauled in the sled putting less weight on the operator; 4) a child may rest during his/her own skiing by placing skis and poles in the carrying straps and riding in the sled; 5) the harness system provides stability when traveling down or across a slope by keeping the sled and skier a constant distance apart; 6) the rigid but flexible nature of the plastic harness frame and towing poles provides suitable leverage for controlling skiing turns; 7) the skis and poles of the towing skier are kept at a constant and safe distance from the sled and rider by the harness system; and 8) the entire assembly may be disassembled for transport and storage.

It is thought that the present invention will be understood from the foregoing description and it will be apparent that various changes may be made thereto without departing from its spirit and scope or sacrificing all of its material advantages, the form hereinbefore described being merely preferred or exemplary embodiment thereof.

Having thus described the invention, what is claimed is:

1. A kit for adapting a sled to a cross-country sled assembly for transporting a passenger and equipment over snow-covered terrain while nordic skiing, said kit comprising:
   (a) a towing harness system for interconnecting a sled and a skier's torso; and
   (b) a seat and frame structure for mounting on the sled to partially support a passenger thereon, said seat and frame structure including
      (i) a substantially U-shaped frame member having an upper bight portion and a pair of leg portions connected to and merging from said bight portion and being attachable at their lower ends to the opposite sides of the sled spaced forwardly from the rear end of the sled, and
      (ii) an upright frame member extending between and connected at its respective opposite ends to said bight portion of said U-shaped frame member and to the rear end of the sled for supporting said U-shaped frame member in an inverted and inclined relationship to a top portion of the sled.

2. The kit of claim 1 wherein said towing harness system includes:
   an elongated towing structure connectable to the sled; and means for attaching said towing structure to the skier's torso.

3. The kit of claim 2 wherein said towing structure includes a pair of elongated towing poles.

4. The kit of claim 3 wherein said towing structure also includes means for pivotally coupling said towing poles to the sled, said coupling means being composed of a hollow tubular hinge member attachable to a front end of the sled, and a tubular cross member attached to rear ends of said towing poles and extending through said tubular hinge member and rotatably mounted within said tubular hinge member.

5. The kit of claim 1 wherein said seat and frame structure also includes a seat cover and cushion mounted by and extending between said inclined leg portions of said inverted U-shaped frame member and extending in overlying relation to the top portion of the sled.

6. The kit of claim 1 further comprising:
sets of carrying straps with releasable connecting elements for attachment on sides of the sled to hold equipment.

7. A kit for adapting a sled to a cross-country sled assembly for transporting a passenger and equipment over snow-covered terrain while nordic skiing, said kit comprising:
(a) a towing harness system for interconnecting a sled and the torso of a skier, said towing harness system including an elongated towing structure connectable to the sled and a belt attached to said towing structure for wearing about the torso of the skier; and
(b) a seat and frame structure for mounting on the sled to partially support a passenger thereon, said seat and frame structure including
(i) a substantially U-shaped frame member having an upper bight portion and a pair of leg portions connected to and merging from said bight portion and being attachable at their lower ends to the opposite sides of the sled spaced forwardly from the rear end of the sled, and
(ii) an upright frame member extending between and connected at its respective opposite ends to said bight portion of said U-shaped frame member and to the rear end of the sled for supporting said U-shaped frame member in an inverted and inclined relationship to a top portion of the sled.

8. The kit of claim 7 wherein said towing structure includes a pair of elongated towing poles.

9. The kit of claim 8 wherein said towing structure also includes means for pivotally coupling said towing poles to the sled, said coupling means being composed of a hollow tubular hinge member attachable to a front end of the sled, and a tubular cross member attached to rear ends of said towing poles and extending through said tubular hinge member and rotatably mounted within said tubular member.

10. The kit of claim 7 wherein said seat and frame structure also includes a seat cover and cushion mounted by and extending between said inclined leg portions of said inverted U-shaped frame member and extending in overlying relation to the top portion of the sled.

11. The kit of claim 7 further comprising:
sets of carrying straps with releasable connecting elements for attachment on sides of the sled to hold equipment.

12. A cross-country sled assembly for transporting a passenger and equipment over snow-covered terrain while nordic skiing, said sled assembly comprising:
(a) an elongated sled;
(b) a towing harness system pivotally connected at a rear end to said sled and attachable at a front end to the body of a skier for towing of said sled as the skier participates in cross-country skiing; and
(c) a seat and frame structure removably mounted on said sled for partially supporting a passenger thereon, said seat and frame structure including
(i) a substantially U-shaped frame member having an upper bight portion and a pair of leg portions connected to and merging from said bight portion and being attachable at their lower ends to the opposite sides of the sled spaced forwardly from the rear end of the sled, and
(ii) an upright frame member extending between and connected at its respective opposite ends to said bight portion of said U-shaped frame member and to the rear end of the sled for supporting said U-shaped frame member in an inverted and inclined relationship to a top portion of the sled.

13. The sled assembly of claim 12 wherein said towing harness system includes:
an elongated towing structure pivotally connected to said sled; and
means for attaching said towing structure to the skier's torso.

14. The sled assembly of claim 13 wherein said towing structure includes a pair of elongated towing poles.

15. The sled assembly of claim 13 wherein said attaching means is a belt for wearing by the skier.

16. The sled assembly of claim 12 wherein said seat and frame structure also includes a seat cover and cushion mounted by and extending between said inclined leg portions of said inverted U-shaped frame member and extending in overlying relation to the top portion of the sled.

* * * * *